H. W. LEONARD.
ELECTRIC RAILWAY AND ELECTRIC MOTOR CONTROL.
APPLICATION FILED MAR. 25, 1908.

1,076,214.

Patented Oct. 21, 1913.
4 SHEETS—SHEET 1.

Fig. 1

Witnesses
Geo. N. Kerr
Edmund P. Dubois

H. Ward Leonard Inventor
By his Attorneys
Edwards, Sager & Wooster

H. W. LEONARD.
ELECTRIC RAILWAY AND ELECTRIC MOTOR CONTROL.
APPLICATION FILED MAR. 25, 1908.

1,076,214.

Patented Oct. 21, 1913.

H. W. LEONARD.
ELECTRIC RAILWAY AND ELECTRIC MOTOR CONTROL.
APPLICATION FILED MAR. 25, 1908.

1,076,214.

Patented Oct. 21, 1913.

Witnesses
Geo. N. Kerr
Edmund O. Duboeg

A. Ward Leonard
Inventor
By his Attorneys
Edwards, Sager & Wooster

UNITED STATES PATENT OFFICE.

HARRY WARD LEONARD, OF BRONXVILLE, NEW YORK.

ELECTRIC RAILWAY AND ELECTRIC-MOTOR CONTROL.

1,076,214.  Specification of Letters Patent.  Patented Oct. 21, 1913.

Application filed March 25, 1908. Serial No. 423,117.

*To all whom it may concern:*

Be it known that I, HARRY WARD LEONARD, a citizen of the United States, residing at Bronxville, in the county of Westchester and State of New York, have invented certain new and useful Improvements in Electric Railway and Electric-Motor Control, of which the following is a full, clear, and exact specification.

My invention relates principally to an improvement in method and means for operating electric railways, and in general the object is to produce an improved system of control whereby the size, weight, first cost, cost of repairs and losses of the locomotive apparatus are reduced. I also secure a very wide range in control of the speed and torque of the propelling electric motors.

More particularly my invention relates to an improvement in the method of and means for operating an electric railway vehicle or train, and in which railway system there are both high tension and low tension sections. My invention is applicable however to many forms of apparatus other than railway apparatus and has many useful features in addition to those referred to. As an illustration of one application, I will describe one form as applied to a railway.

In operating electric railways, it is sometimes important and desirable to operate a vehicle in a section in which there is a high tension supply conductor or conductors, and also to operate the same vehicle in a section in which there is a low tension supply conductor or conductors. For example, it may be desirable to operate a vehicle or train while it is within the limits of a city or a part of a city, or other locality by means of low tension working or supply conductors for the purpose of reducing certain hazards to a minimum or for other reasons; but when the vehicle or train is in the open country, or when such hazards are not great or such other reasons do not apply, it may be desirable to operate the vehicle or train from high tension supply or working conductors. It is, of course, desirable to accomplish this result in as simple and efficient a manner as possible, and my present invention obtains this result to a much greater degree than prior means or methods.

Other objects and advantages are obtained by means of my invention as will be understood from the following description and accompanying drawings.

Figure 1:
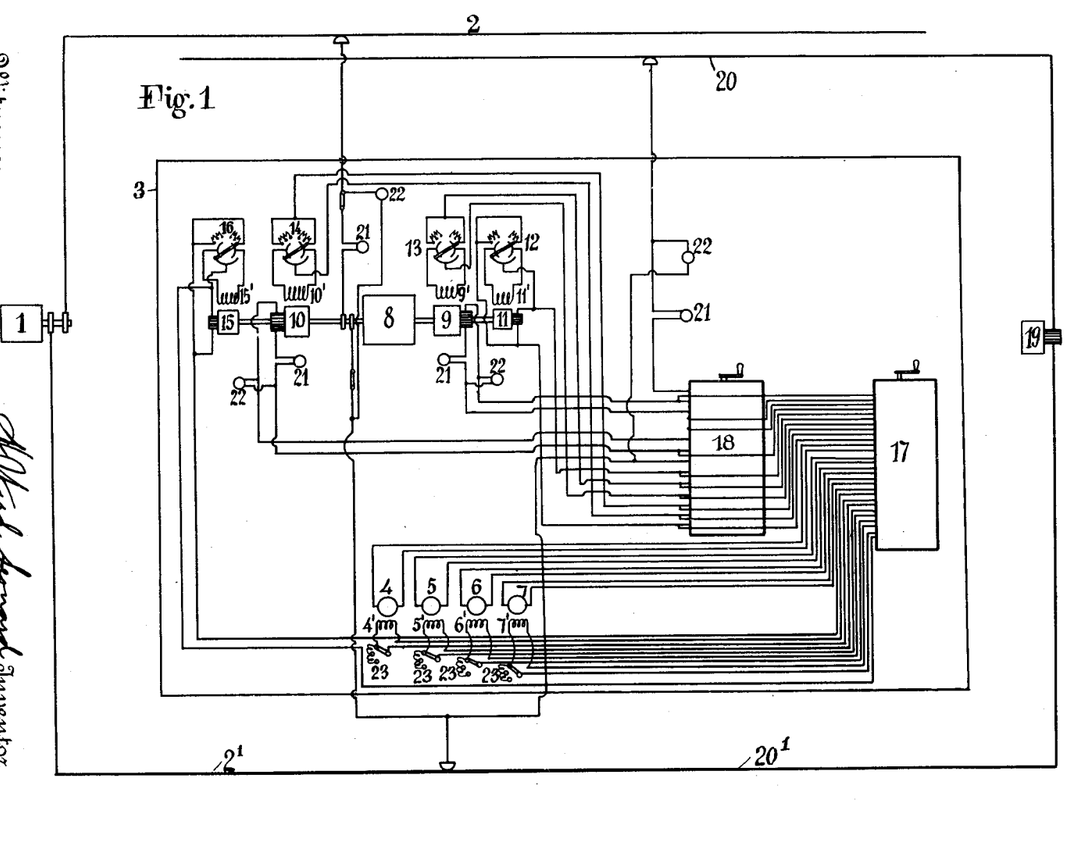
Figure 1 is a diagram illustrating one embodiment of my invention.

Referring to Fig. 1, a source of alternating current energy is indicated at 1. High tension supply conductors are indicated at 2, 2', and these may receive energy from the stationary source 1 directly, or transforming apparatus may be utilized if desired for supplying energy of higher tension to the working conductors than is furnished by the source 1. I have indicated a single phase source, but this may sometimes be polyphase and polyphase supply conductors may be sometimes used, and in some instances the high tension current may be uni-directional. The supply or working conductors may be arranged in any suitable manner, such as overhead or surface conductors, or with a ground return. The outline of the vehicle or locomotive is indicated diagrammatically by dotted lines at 3, and although but one vehicle is indicated it will be understood that the apparatus may be carried on more than one vehicle if desired.

I have indicated four propelling motors of the direct current type, having armatures 4, 5, 6, 7, and separately excited field windings 4', 5', 6' and 7'. In some cases however, motors of other type may be used, and they may sometimes be series motors, or may have series windings in addition to the separately excited windings, or a winding may be used so as to be a series winding or a separately excited winding depending upon conditions. The electromotive force of the energy applied to the motors is preferably of comparatively low tension and the transforming apparatus indicated in Fig. 1 for transforming the high tension energy of the line to low tension energy comprises an alternating current motor 8, which may be any suitable form of motor, preferably one which is adapted to act as a generator so as to regenerate energy for braking purposes, and also comprises two main direct current generators 9, 10. These are shown as being driven by the motor 8, being mounted upon the same shaft. An exciter 11 is also indicated as being mounted upon the same shaft, and in this instance is shown as supplying energy for exciting the separately excited field windings 9', 10', of the generators 9, 10 respectively. These generators may in some instances have additional series or shunt coils or both. The exciter 11 is indicated as being shunt wound, although it may sometimes be desirable to make the exciter compound by adding a series winding. In each case however, the electromotive force of the exciter may be varied as desired and reversed by means of a reversing rheostat 12 connected in circuit with the field winding 11' across a source of electromotive force such as exciter 15. By operation of this rheostat 12, the electromotive force of the generators 9, 10 may be simultaneously controlled as desired by reason of the change in electromotive force applied to the field windings 9', 10'. In series with the circuits supplying current to the separately excited windings 9', 10', are shown regulating and reversing rheostats 13, 14, respectively, by means of which the electromotive forces of the generators 9, 10 may be separately and independently controlled. I have shown an additional exciter 15 for supplying current to the field windings of the propelling motors. The winding 15' of the exciter is shown as having in circuit therewith a regulating and reversing rheostat 16, whereby, as indicated above in referring to exciter 11, the electromotive force of the exciter may be varied or reversed as desired. This exciter may be compound wound as referred to in connection with exciter 11.

My preferred relationship of apparatus for obtaining reversal of the fields of the exciters are disclosed and claimed in patent granted to me September 19, 1911, No. 1,003,923.

A controlling switch is indicated at 17 for controlling the speed and torque of the motors as will hereinafter be described, and a change-over controlling switch is indicated at 18, the operation of which will be described below. The stationary direct current source of comparatively low electromotive force is indicated at 19 supplying energy to the low tension working conductors 20, 20' of the low tension section. The low tension and high tension working conductors are shown as overlapping each other for a considerable distance for enabling the operator to pass from one section to the other without interruption of the supply of energy to the controlling apparatus as will be explained. Sometimes a section will be equipped with both high tension and low tension conductors so that either or both sources of supply can be used at the will of the operator. Moving contacts are shown as engaging the working conductors, and ammeters 21, and voltmeters 22, are shown connected in or to the main circuits, although it will, of course, be understood that various other indicating instruments and protective devices may be introduced as understood by those skilled in the art. When operating in the high tension section and taking energy from the mains 2, 2' the machines 9, 10 will act as generators supplying energy to the propelling motors, and one arrangement for carrying out certain of the objects of my invention when working in the high tension section will now be described.

Figure 2:
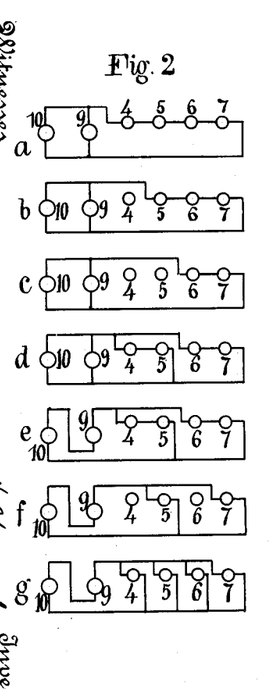
Fig. 2 is a diagram illustrating certain of the connections of the apparatus when the locomotive is operating from the high tension conductors.

In starting and for securing low speed and large torque, the connections of the armatures 9, 10, and the motor armatures 4, 5, 6, 7 are indicated at $a$, Fig. 2. The sources 9, 10 are then connected in parallel with each other supplying energy to the motor armatures which are all connected in series with each other. In this condition the motors will have full field strengths, and the field strength of the generators 9, 10 will be gradually increased simultaneously to any desired degree, and the electromotive force supplied to the motors will be thereby controlled, controlling the speed correspondingly. When the sources supply their maximum electromotive force and it is desired to further increase the speed, one of the motors may be cut out of circuit, leaving three motor armatures connected in series as indicated in condition $b$. This may be readily accomplished by reducing the field strength of one motor and short circuiting the motor, after which it may be removed from circuit without interruption of the supply circuit to the remaining motors. The three remaining motors will then receive full electromotive force of the generators, resulting in a corresponding increase in electromotive force per motor and consequently an increase in speed. For obtaining a further increase in speed, another motor may similarly be removed from circuit, leaving two motors in series as indicated in condition $c$, or in order to distribute the work equally upon the motors, the fields of the two motors removed may be built up and the armatures connected in series to the supply circuit from the generators, giving two sets of two motors in series, each set connected in parallel with reference to the sources as indicated in condition $d$. The electromotive force applied to the motors may now be still further increased by changing the relation of the sources 9, 10 from parallel to series relation, and by relative control of their field strengths. In order to remove one of the sources from circuit preparatory to the connection in series, it is preferable to throw the entire load upon one of the sources, after which the other source may be disconnected without the disadvantage of breaking a circuit carrying a large current. Thus the field of generator 9 may first be weakened somewhat relatively to that of generator 10 and so cause generator 10 to assume the full load, after which the source 9 may be disconnected. The field strength of generator 9 will then be reduced to a minimum, after which the sources 9, 10 will be connected in series with reference to the motors as shown at $e$, and preferably without interruption of the supply circuit to the motors. In the condition as shown at $e$, the field strength of generator 9 may gradually be increased in such a direction that its electromotive force will be additive to that of generator 10, which will correspondingly increase the electromotive force applied to the motors and correspondingly increase the speed. When generator 9 receives full field strength, the electromotive force applied to the motors will be twice that applied to the motors in condition $d$. For obtaining a further increase in speed, one of the motors in each series circuit may have its field strength reduced, and after being short circuited, may be removed from circuit, obtaining a condition shown at $f$. This applies twice the electromotive force to the remaining motors compared with the condition shown at $e$, and correspondingly increases the speed. By connecting the motors 4, 6, after building up their field strengths, in parallel with the motors 5, 7, the condition shown at $g$ will result wherein the load on the motors will be equally divided. A still further increase in speed may now be obtained by weakening the field strength of all the motors.

In order to more fully explain the advantageous results of the above described relation of the sources and of the motors, I will assume that each of the sources 9, 10 has a normal volt capacity of 1 and an ampere capacity of 1; I will also assume that the normal ampere capacity of each motor to be 2, and the volt capacity also to be 2 units. That is, each source will have a normal watt capacity of one unit, and each motor winding will have a normal watt capacity of four units, giving a total watt capacity of the sources as 2, and a total watt capacity of the motors as 16. In condition $a$ of Fig. 2, the field control of the two generators will secure a range of control from a minimum up to a volt capacity of 1, the two sources being in parallel, and may attain an ampere capacity of 2, giving the total normal watt capacity of 2. The motor windings will each carry two ampere units in full field strength of the motors, and there being four motors working in unison on the common load, the torque exerted will be that due to 8 ampere units in fields of full strength which we can designate as a torque of 8, and with a speed due to $\frac{1}{4}$ of the volts of one generator upon each motor which we can designate as speed $\frac{1}{4}$, the mechanical power obtained will be 2, the same as the electrical capacity of the generators. In condition $b$, the volts and amperes supplied by the two sources will be the same as before, giving watts 2, and as there are now only three motors in circuit, the torque will be 6 with an increase in speed to $\frac{1}{3}$, giving power 2. In condition $c$, the volts and amperes remain as before, but with only two motors in circuit in series with each other and each receiving two amperes, the torque is reduced to 4 and the speed increased to $\frac{1}{2}$, giving a power of 2. In condition $d$, the same general condition exists, excepting that the load is distributed between the four motors instead of being carried by two motors. In condition $e$, the generators have been changed from a parallel to a series relationship, and the volt capacity of the sources has been increased to 2, and the ampere capacity reduced to 1, giving a watt capacity of 2 as before. With full field strength of the two generators, each motor will carry amperes $\frac{1}{2}$, giving a total torque of 2 with an increase in speed to 1, and consequently, a power of 2, the same as the energy capacity of the sources. In condition $f$, each motor receives a current of $\frac{1}{2}$, giving total torque 1, whereas the speed will be increased to 2, giving a power of 2. In condition $g$, about the same result is obtained as in condition $f$, except that the load is divided between the four motors equally. By weakening the motor fields within limits permissible, the speed may be still further increased with corresponding reduction in torque. If we assume that in this way the speed may be quadrupled, we could obtain in the extreme condition a speed of 8 with torque of $\frac{1}{4}$, and power 2. It will therefore be seen that with this particular arrangement of two generators and four motors, the great range in control of speed and torque is obtained by a total generator capacity of only $\frac{1}{8}$ of the total watt capacity, and yet the motors are worked at their maximum voltage and maximum ampere capacity, although these conditions do not occur at the same time.

It will be understood that the above explanation is only intended as a general description to assist in understanding certain useful features of my invention, and that I have not considered the losses or resistances in the machines. The result in general would, however, be the same had I taken these into consideration. It will further be understood that although I have considered the use of two generators and four motors, corresponding advantage may be obtained by using a different number of machines, or a different relation in the number of generators and motors. It will also be understood that the particular conditions of connections indicated in Fig. 2 may be departed from, and various other steps or relationships may be introduced without departing from the scope of my invention.

I will now consider the arrangement of the same apparatus and the method of control when in the low tension section and when receiving energy from the local source or sub-station machine 19.

By a suitable arrangement of switches and controlling apparatus, I connect the machine 10 across the working conductors of the low tension section, and operate the machine as a motor for the purpose of controlling the other machine 9 as a voltage regulator for the motor armatures. The machine 9 acting as a voltage controller is connected in series with the motors and the local source, and at times supplies energy in conjunction therewith to the propelling motors. With this arrangement of connections, I may vary and reverse the field strength of the voltage regulating machine whose armature is in series with the local source and with the motor armature, causing it to act with the electromotive force of the local source, or causing it to oppose this electromotive force, in the manner described in patent granted to me December 8, 1896, No. 572,903. In this way I secure wide range in control of the speed and torque, and by further control of the relation of the motors, I greatly increase the control of the speed and torque.

Figure 3:
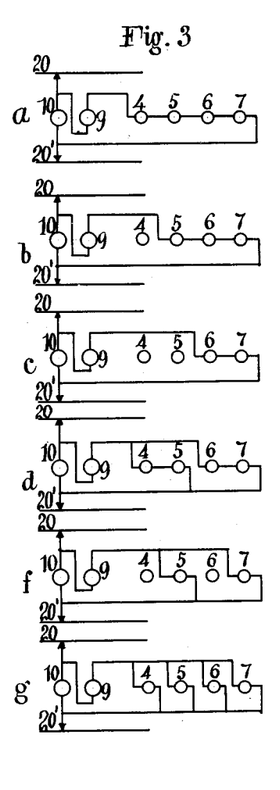
Fig. 3 is a diagram illustrating certain of the connections of the apparatus when the locomotive is operating from the low tension conductors.

Referring to Fig. 3, I have indicated certain changes in connections illustrating some of the running conditions when in the low tension section. The machine 10 is indicated as connected across the working conductors 20, 20' of the low tension section and adapted to act as a motor for driving machine 9 as a generator, or to act as a generator when driven by 9 acting as a motor. The machine 9 is shown connected in series between the propelling motors and the local source. With the condition of connections shown at $a$ of Fig. 3, it will be understood that when the rheostat 13 is in such condition as to give full field strength to the armature 9, and of such direction that the electromotive force of armature 9 opposes and equals that of the local source, then no resultant electromotive force will be applied to the motors and they will remain at rest. A gradually increasing electromotive force may now be applied to the motors by weakening the field of 9 until it is producing no electromotive force; the motors will then be receiving the full line electromotive force of the local source. It is to be noted that the electromotive force generated by 9 in opposition to the local source is a counter-electromotive force and that under such conditions 9 acts as a motor, absorbing energy and tending to drive 10 as a generator delivering energy to the motors. By now reversing the field strength of 9 and gradually increasing the same, the motors will be subjected to further increase in electromotive force until they will receive a resultant electromotive force equal to that of the local source plus that of 9 acting as a generator, and now driven by 10 acting as a motor and receiving energy from the local source. The maximum torque will be obtained with the motors connected in series with each other as indicated in condition $a$ of Fig. 3. The torque is decreased and speed correspondingly increased for the same applied resultant electromotive force by connection of the motors as shown at $b$, and similarly, in passing through the remaining conditions $c, d, f,$ and $g$, the torque will be decreased with corresponding increase in speed with the same resultant electromotive force applied to the motor armature circuit. The conditions indicated in Fig. 3 correspond to the conditions indicated by the same letters in Fig. 2, in so far as the connections of the motors are concerned. For the purpose of obtaining electromotive force higher than normal, the field of machine 10 may be weakened when in the low tension section, causing the machine 9 to generate a higher electromotive force, and when in condition $g$ of Fig. 3, the field strength of the motors may be weakened for the purpose of obtaining a still greater increase in speed.

Considering condition $a$ of Fig. 3, and with the same volt and ampere capacity as previously referred to, it will be seen that there is a range in volt capacity from zero to a normal maximum of 2, assuming the volt capacity of the local source to be 1. It will also be seen that the ampere capacity is 1, giving a maximum normal watt capacity of 2. With amperes of 1 unit passing through the four motors in series, the torque will be 4 with a maximum speed of ¼ and power of 2. It will be noted that while working in this manner in the low tension section, part of the energy from the sub-station passes directly to the motors without being transformed, and part of the energy is transformed on the vehicle and supplied to the motor. Thus of the total energy supplied by the sub-station, approximately one-half is transformed on the vehicle, and after transformation is combined with the other half and then supplied to the motor armatures, assuming that the full normal voltage of 9 is added to that of the local source applied to the motors. It will also be noted that in this condition the sub-station supplies amperes of two units capacity, one unit of which is supplied directly to the motor circuit and the other is supplied to a motor 10 in parallel therewith. With one motor cut out of circuit as in condition *b* of Fig. 3, the capacity in watts will be 2 as in condition *a*, but the maximum speed will be ⅔ with reduction of torque to 3 and power of 2 as before. With only two motors in circuit as in condition *c*, the watt capacity will be 2, giving a speed of 1 and torque 2. Approximately the same condition will be obtained in condition *d*, excepting that the load will be distributed between the four motors. In conditions *f* and *g*, the watt capacity will be 2 and produce a speed of 2 with torque 1, the load being distributed between the four motors in position *g*, as distinguished from two motors in condition *f*. If we assume that by weakening the motor fields the speed may be quadrupled, a speed of 8 could then be obtained with torque of ¼. Thus, it will be seen, that with this method of operation and control in the low tension section, a great range in control of the speed and torque is obtained with the same relation of capacity of the machines 9, 10 to the capacity of the motors as referred to in connection with the method of control disclosed in reference to Fig. 2. It will also be seen that when working in the low tension section, the machines 9, 10 may be worked at their maximum voltage and maximum ampere capacities, and that the motors may be worked at their maximum voltage capacities. In other words I can apply to the motors in the low tension section, the same maximum power as I apply in the high tension section and have a smooth voltage speed control from rest to full speed in either direction. It will also be noted that the same maximum speed may be obtained in the low tension section as when in the high tension section, and that the same torque is obtained in each case at the maximum speed.

Figure 4:
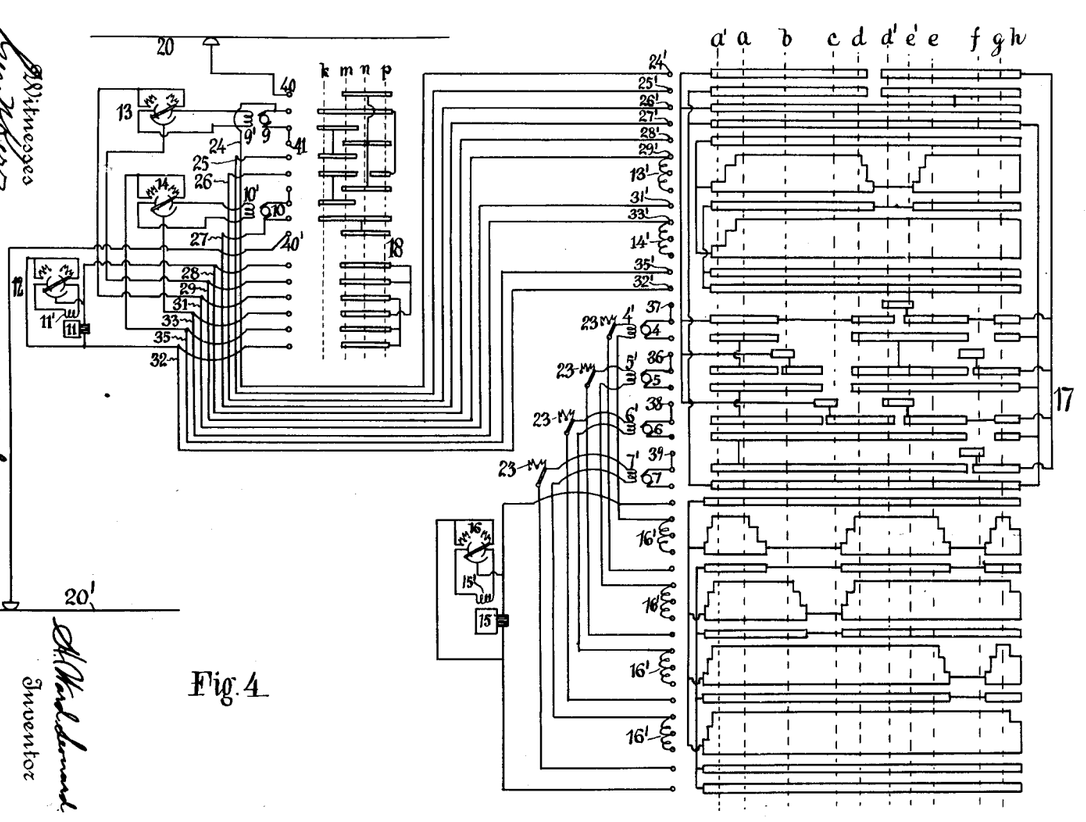
Fig. 4 is a diagram showing the development of one form of controlling switch or switches for obtaining the desired connections and relation of the parts.

The method of control above described may be obtained by various specific forms of controlling apparatus. In Fig. 4, I have indicated one form of controlling switch or switches for securing the above described operation, and which form is of particular advantage in that the same controlling switch or controlling devices are used when in the low tension section as when in the high tension section. Moreover, I provide controlling means whereby if desired the vehicle may pass from one section of the road to the other without any interruption in the supply of energy to the propelling motors, and therefore avoid stopping the vehicle or reducing the speed to a small amount. The parts designated by the same characters in Fig. 4 as in Fig. 1, indicate corresponding parts, although in Fig. 4 the various parts are differently located with reference to each other for convenience and simplicity in showing the connections. At the right of Fig. 4 is shown the development of the switch for controlling the speed and starting and stopping of the vehicle when in either the high tension section or in the low tension section. At the left of Fig. 4 is shown the development of a controlling switch which might be termed the change-over switch, and which is used for making the desired changes and connections when passing from one section to the other. A series of fixed contacts is shown on vertical lines and which are connected to the various controlling apparatus and interconnected as shown. These fixed contacts are adapted to engage the contacts on the controlling cylinders when the latter are operated, and the development of which is shown in the drawing. Between certain of the fixed contacts variable resistances 13′, 14′, are shown connected and which by the operation of the speed controlling switch are adapted to be cut in and out of the field circuits of the machines 9, 10, respectively. Similarly, resistances 16′ are connected to certain of the fixed contacts of the speed controlling switch, the movement of which causes certain parts of said resistances to be cut in or out of circuit with the respective field windings 4′, 5′, 6′ and 7′ of the propelling motors. Variable resistances 23 are also shown adapted to be inserted in the respective field circuits of the motors, and these may be independently or simultaneously adjusted for varying the motor field strengths or their relation to each other. Considering first the control when in the high tension section, the circuits of the alternating current motor 8 will be closed and receiving energy of comparatively high tension from the working conductors of the high tension section and will be driving the machines 9, 10 and the exciters 11, 15 at substantially constant speed. The change-over switch 18 will be in such position that the fixed contacts will make engagement on the line *k* of the controlling cylinder. This however, does not close the working circuits, owing to the speed controlling switch 17 being in off-position. When the latter is moved so that the fixed contacts make enengagement with the controlling cylinder on the line *a′*, the circuits will be then closed and a comparatively low electromotive force will be applied to the motor armatures giving low speed, the connections being as shown at *a* of Fig. 2. Thus, if the connections be traced in Fig. 4, it will be seen that a closed circuit is formed including the armature 9 and the motor armatures 4, 5, 6 and 7 in series, as follows:—from the upper terminal of armature 9 through wire 24 to contact 24′, then to the upper contact strip on the cylinder of switch 17, from which a connection leads to a lower contact on the cylinder opposite the upper terminal of motor armature 4, then from this contact out through the motor armature 4 and back through certain contacts on the cylinder, then through motor armature 5 and through certain cylinder contacts, through armature 6, and by means of cylinder contacts, to armature 7, from the lower terminal of which connection is made to a conducting strip on the cylinder from which a connection leads to the second cylinder strip from the top, then out to contact 25' and contact 25, and then through certain contacts on the cylinder of switch 18 to the lower terminal of armature 9, thus connecting armature 9 and the motor armatures all in series. It will also be seen that armature 10 is connected in series with the motor armatures and in parallel with armature 9 by tracing the connections. The upper terminal of armature 10 is connected through contacts on the cylinder of switch 18 to terminal 26, from which connection leads to contact 26', and which is connected by means of contacts on the controlling cylinder of switch 17 to contact 24', which is in turn connected to the upper terminal of armature 9. Connection is made from the terminal of armature 10 through conductor 27 to contact 27' and then by contacts on the cylinder of switch 17 to contacts 25' and 25, and then through the switch 18 to the lower terminal of armature 9. Armature 10 is therefore connected in parallel with armature 9 and in series with the motors, as indicated at $a$ of Fig. 2. Taking now the connections of the field circuits of the sources 9, 10, it will be seen that the exciter 11 is connected to the field windings 9', 10', with the resistances 13', 14' inserted in circuit, which cause the fields of the sources to have a low excitation, and the armatures 9, 10 to apply a correspondingly low electromotive force to the motors. Thus, it will be seen that conductor 28 from the upper terminal of armature 11 in Fig. 4, leads to contact 28', and then by cylinder contacts of switch 17 to the lower contact of resistance 13', thence through all of the resistance 13' to contact 29', thence by conductor 29 to and through the reversing rheostat 13 and field winding 9', then by conductor 31 to contact 31', then through switch 17 to contact 32' and by conductor 32 to the lower terminal of the exciter 11. The circuit of the field winding 10' extends from the upper terminal of exciter 11 as before, to terminal 28', thence through switch 17 to the lower contact of resistance 14', then through all of the resistance 14' to contact 33' and by conductor 33 to and through the reversing rheostat 14 and field winding 10' to conductor 35 and contact 35', and then through switch 17 to contact 32' and then by conductor 32 to the lower terminal of armature 11.

It will be seen that the motors receive their full field strength in position $a'$, the resistances 16' being short circuited. Thus the lead from the upper terminal of exciter 15 makes connection through the cylinder of switch 17 to the upper contact of resistance 16', which is connected to the field circuit 4', the connection being completed through winding 4' to a contact engaging the switch cylinder, and then through the switch to the lower terminal of armature 15. The connections of the field circuits 5', 6', 7' may be traced in a similar manner by which it will be seen that all of the resistances 16' are short circuited, giving full field strength to the motors disregarding the adjustment of rheostat 16 or the resistances 23. It will be noted that when switch 17 is turned from off-position, the motor fields are first energized with resistances 16' in circuit with each field winding, and that these resistances are gradually short circuited in passing to position $a'$. It will also be noted that when the armature circuits are closed by movement of switch 17, the motor fields have already been fully excited. As the controller 17 is moved from position $a'$ to position $a$, the field strength of the generators 9, 10 will be gradually increased and apply a gradually increasing electromotive force to the motor armatures by reason of the gradual short circuiting of the resistances 13', 14' simultaneously, until at position $a$, the generators will deliver their maximum electromotive force to the motors. In passing to the position $b$ of Fig. 2, it is desirable to remove armature 4 from service without interruption or breaking of the main circuit. This may be accomplished by first reducing the field strength and counter-electromotive force of the motor 4, after which it may be short circuited and then removed from circuit. I accomplish this by the switch 17 in passing from position $a$ to position $b$. As the switch is turned from position $a$, it will be seen that sections of the upper resistance 16' are gradually inserted in the circuit of the field winding 4', thereby gradually decreasing the field of armature 4 until the field circuit of winding 4' is finally interrupted. By means of a fixed contact 36 which is connected to the upper terminal of armature 5, the latter terminal is now connected to circuits leading to the upper terminals of armatures 9, 10 through the medium of coöperating contacts and connections of switch 17. Armature 4 is thus short circuited, and by further movement of switch 17 to position $b$, the connection between armatures 4 and 5 is broken, as well as the connection of the upper terminal of the armature 4 to the machines 9, 10. The condition $b$ of Fig. 2 is thus obtained without interruption of the working circuits. As the switch 17 is moved from position *b* to position *c*, it will be seen that sections of one of the resistances 16' is gradually inserted in the circuit of the field winding 5', after which this field circuit is then interrupted, and the armature 5 is then short circuited and removed from circuit in the same manner as described with reference to the motor 4, thus securing in position *c* the condition of two motor armatures connected in series and receiving the full electromotive force of the two sources in parallel as indicated at *c* of Fig. 2. In passing from position *c* of Fig. 4, to position *d*, the field strength of the motors 4 and 5 is first built up to a maximum, and the armatures 4, 5 are then connected in series with each other and in parallel with the circuit containing the armatures 6, 7 so that in position *d*, the condition of connections shown at *d* in Fig. 2 is obtained. It is now desired by further movement of the controlling switch to connect the sources 9, 10 in series with each other as shown at *e* in Fig. 2, the field strength of armature 9 first being reduced to zero or to a minimum. This change in connections should also preferably be accomplished without interrupting the working circuit. Referring to Fig. 4, it will be seen that movement of the controlling switch from position *d*, first causes a portion of resistance 13' to be inserted in the circuit of the field winding 9', thereby weakening the field of the source 9, and causing the main portion of the load or all of the load to be assumed by the remaining source 10. Armature 9 is then disconnected from circuit without material sparking by further movement of the controller, after which the field strength of source 9 is gradually reduced to zero by inserting all of the resistance 13' and then interrupting the field circuit. Further movement of the controller causes the armature 9 to be connected in series with armature 10 by causing the lower terminal of armature 9 to be connected to tne upper terminal of armature 10, which latter is still connected to the motor armature circuit, and at the same time this connection is made, the upper terminal of armature 9 is connected to the upper terminals of motor armatures 4 and 6. Further movement of the controller then breaks the connections between the upper terminal of armature 10 and the upper terminals of armatures 4 and 6, thus placing armature 9 in the working circuit in series with armature 10 and supplying current to the motor circuits as shown at *e* of Fig. 2. With more particular reference to the change in connections made by switch 17 for securing the above result, it will be seen by referring to Fig. 4, that when the switch is in the condition *d'* while passing from position *d* to positions *e'* and *e*, the armature 10 is still connected to the motor circuit in the same manner as in position *d* and is at full electromotive force. Passing from the upper terminal of armature 10, it will also be seen that armature 9 is connected in series therewith, and that from the upper terminal of armature 9 connection is made to the motor circuits by connections to the upper terminals of armatures 4 and 6. Thus, from the upper terminal of armature 10 at the left of Fig. 4, connection leads through switch 18 to contacts 26, 26', then by way of switch 17 to contacts 25', 25, then by switch 18 to the lower terminal of armature 9 and through armature 9 to its upper terminal, then by conductor 24 and contact 24' to one of the upper contacts on the cylinder of switch 17, thence by a connection at the right to two cylinder contacts which coöperate respectively with fixed contacts 37, 38, thereby connecting the upper terminal of armature 9 to the two motor circuits containing the armatures 4, 5 and 6, 7 in series respectively. The further movement to position *e'*, causes the connections between the upper terminals of motors 4 and 6 to the upper terminal of armature 10 to be broken, thus throwing the inert armature 9 in series with the working circuit as above explained, and obtaining the condition *e* of Fig. 2. In position *e'*, the field of the source 9 is not excited and the motors are therefore subjected only to the electromotive force of the source 10, giving approximately the same speed as in position *d*. Movement of the controller while maintaining the circuit connections of the armatures, now causes the field of source 9 to have a low excitation by closing its field circuit through all of the resistance 13', which secures a corresponding increase in the electromotive force applied to the motor armature circuits and a corresponding increase in speed. As the switch 17 is moved further, the resistances 13' are gradually short circuited until at position *e*, all of resistance 13' is removed from the field circuit, causing armature 9 to generate its full electromotive force. The motor circuits will then be subjected to the full electromotive force of the source 10 plus the full electromotive force of source 9, giving corresponding increase in speed of the vehicle. As the switch 17 is moved from position *e*, the field strength of motors 4 and 6 are gradually reduced to zero by insertion of certain of the resistances 16' and by the final interruption of the field circuits. The motor armatures 4 and 6 are then short circuited by connecting the upper terminals of armatures 5 and 7 to the upper terminal of armature 9 by means of the fixed contacts 36, 39, and contacts on the controlling cylinder which coöperate with said fixed contacts. The connections of armatures 4 and 6 to the working circuit are then broken by further movement of the controller so that in position *f* of Fig. 4, the condition of connections shown at *f* of Fig. 2 is attained. It will be understood that in passing from position *e* to position *f*, a gradual increase in speed is obtained by the gradual weakening of field strength of motors 4 and 6, thus reducing their counter-electromotive force gradually and thereby causing the full electromotive force of the sources to be gradually transferred and applied to the motor armatures 6 and 7. A gradual increase in speed is similarly obtained in passing from positions *a* to *b*, and from *b* to *c*, by the gradual reduction in field strength of the motors 4 and 5 respectively. Movement of controller 17 from the position *f* to position *g*, first causes the armatures 4 and 6 to receive their full field strength, after which the motor armatures 4 and 6 are connected in parallel with the remaining motor armatures, giving at position *g* the condition of connections shown at *g* of Fig. 2. Movement of the controller to position *h* causes the field strength of all of the motors to be simultaneously weakened as desired, thereby obtaining full speed of the vehicle. Reverse movement of controller 17 will cause gradual reduction in speed as the same is moved toward off-position, and of course any speed desired may be obtained by the operator by movement of the controller to any desired position. In any position from *e* to *g* inclusive, the electromotive force of 10 is at its full strength and 9 is in series with it. By varying and reversing the rheostat 13 I can therefore obtain upon the motor armatures any voltage from 0 to 2 and with an ampere capacity of 1. I can also reverse the motors by reversing both of the rheostats 13, 14 or reducing the electromotive force of 10 below that of 9 when they are equal and opposite or vice versa. Movement of the vehicle in the opposite direction at any speed desired may also be obtained by moving the controller 17 to off-position, and by reversing the current from exciter 11 by means of the rheostat 12 which when the field circuit is excited from a suitable source of electromotive force such as exciter 15 will reverse the field excitation of the sources 9, 10, or by reversing the current from the exciter 15 by means of the reversing rheostat 16, which when the field circuit is supplied from a suitable source such as exciter 11 will cause the direction of field excitation of the motors to be reversed which latter method I prefer when my invention is used in connection with a low tension fixed source.

Figure 5:
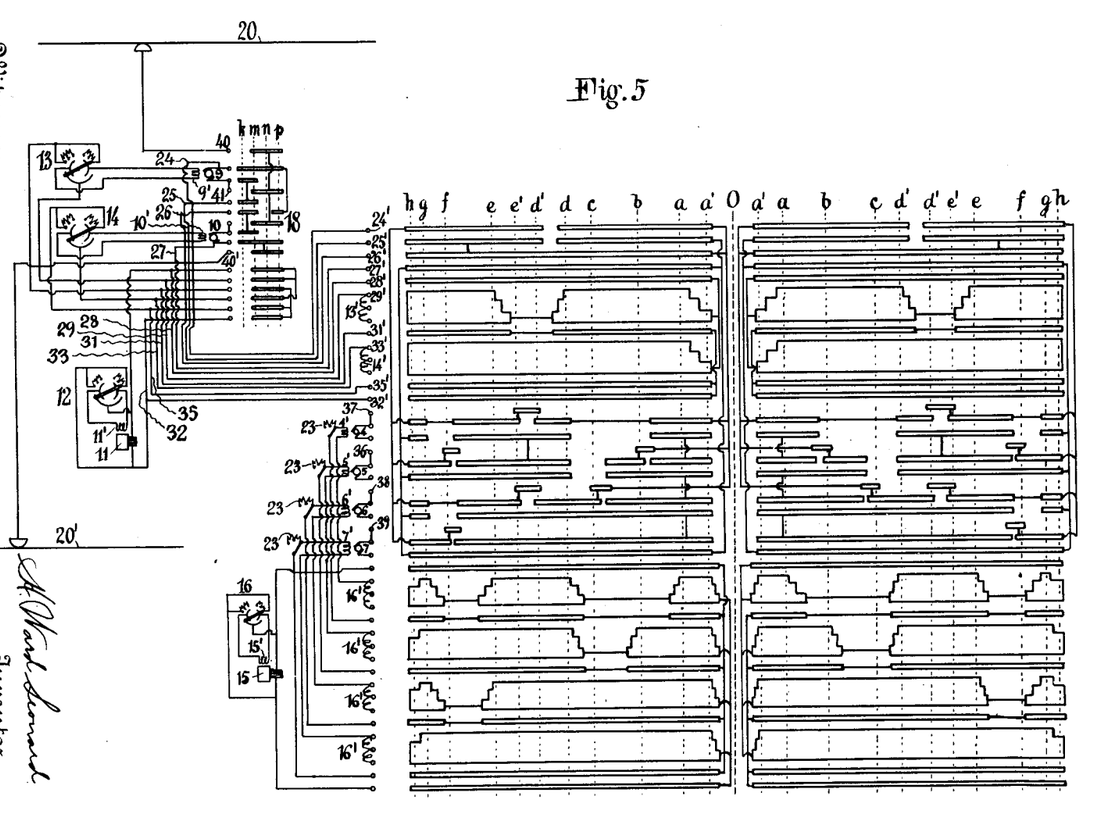
Fig. 5 is a diagram illustrating certain connections for securing reverse movement of the vehicle by operation of the main controlling switch.

It is ordinarily desirable to have the electromotive force upon the motor armature circuit source low when the motor fields are reversed. If desired, reverse movement of the vehicle to full speed might be obtained by means of a single controlling switch and movement of a single handle by duplicating the contacts shown in Fig. 4 on the cylinder of switch 17 in the reverse direction, with the exception that the connections to either the field windings of the motors, field windings of the generators, motor armature connections, or connections of the armatures of the sources should be reversed. An example of such a form of controlling switch is shown in Fig. 5, in which case the reverse movement is obtained by reversing the connections of the motor field windings. In this case the series of fixed contacts will be located on the central line 0 when in off-position, and movement of the controller handle to the right will cause contacts on the controlling cylinder to the right of line 0 to be successively engaged, giving forward movement, and movement of the cylinder from off-position to the left will cause the contacts at the left of line 0 to be successively engaged giving full speed if desired in the reverse direction. When reversal is obtained by movement of a separate switch, it should be protectively interlocked with the main controller so that the reversing switch can be thrown only when the main controller is in a proper position. When in the low tension section, the same controlling switch 17 is used for securing variation in speed and torque by variation in connections of the motors, but the relationship of the machines 9, 10 is different, and the different relationship is secured by means of the change-over switch 18. This will be understood by considering the action of the change-over switch when moved to secure the desired relationship when passing from the high tension section into the low tension section without interruption of the supply of energy to the motor circuits. In accomplishing this, the controller 17 should be in one of the positions *e* to *h*, the armatures 9, 10 then being connected in series. We may assume that the switch 17 is in position *e*, for example, and that the speed of the vehicle corresponds to this position of the controller. When connection is made by means of the sliding contacts to the working conductors of the low tension section, the operator will note the line voltage of such conductors by means of a volt meter 22 connected to these conductors or by other suitable and well known means, and will then adjust the rheostats 14 to such position that the electromotive force produced by the armature 10 will approximately equal the voltage of the low tension working conductors. The electromotive forces of the local source and of the machine 10 are so related that the electromotive force of 10 is counter to that of the local source, this being controlled if necessary by the reversing switches in the armature or field circuits of the motors and the reversing field rheostats 13, 14 and 12. In some cases, the adjustment of electromotive force of armature 10 may be made by adjusting the rheostat 12 and so vary the electromotive force of the exciter 11 which in turn simultaneously varies the current in the field windings 9′, 10′. In some instances when the alternating current motor 8 is of a suitable type, its speed may be varied for securing the desired electromotive force of the armature 10. The adjustment of electromotive force having been obtained by any suitable means, the change-over switch 18 will be turned from position $k$ to position $m$. This movement causes the upper terminal of armature 10 to be connected to the working conductor 20 and causes the lower terminal of armature 10 to be connected to the working conductor 20′, thus giving the condition of connections of armatures 9 and 10 as indicated in Fig. 3. Thus it will be seen by reference to Fig. 4 that in position $m$ of the switch 18, connection leads from conductor 20 to contact 40, then to the upper contact of cylinder 18, and then by a connection from this contact to a contact on the cylinder engaged by the upper terminal of armature 10. Connection is also made by the switch 18 from the lower terminal of armature 10 to contact 40′ and thence to conductor 20′. Connection is also made in this position $m$ from conductor 20 through the switch 18 to contact 41 and thence to the lower terminal of armature 9. Connection is thus made from working conductor 20 through the armature 9 to the motor armature circuits from which return connection is made from contact 27′ through conductor 27 to the lower terminal of armature 10 and thence to the working conductor 20. In position $m$ of switch 18, connection is also made from the terminals of exciter 11 directly to the rheostats 13, 14 of the field windings 9′ and 10′, thus rendering ineffective any change in resistances 13′, 14′ by movement of controlling switch 17. It will thus be seen that controlling switch 18 in position $m$ causes connection to be made directly from the upper terminal of exciter 11 to one lead of rheostat 13 and the return lead being connected directly to the lower terminal of exciter 11. Also connection is made from the upper lead of the exciter 11 to one lead extending to the rheostat 14, the return lead being connected to the lower terminal of exciter 11. The resistances 13′, 14′ being thus rendered ineffective, the adjustment of the field strength of armatures 9 and 10 will be controlled as desired by rheostats 13 and 14. Further movement of change-over switch 18 to position $n$ will cause the connection from the upper terminal of armature 10 to controlling switch 17 to be broken, and will also cause the connection from the lower terminal of armature 9 to controlling switch 17 to be interrupted. Movement of switch 18 to position $p$ causes the upper terminal of armature 9 to be connected to contacts 26, 26′ which results in making direct connection between contacts 24′ and 26′ so that movement of controlling switch 17 through any position will not interrupt the circuit from the upper terminal of armature 9 to the motor armatures. The positions $m$ and $n$ of switch 18 are merely transitory positions, and position $p$ is the running position for the change-over switch when in the low tension section. Having thus secured the desired connections for operation in the low tension section, the operator may then lower the electromotive force of armature 10 slightly by adjustment of rheostat 14, which will cause the load to be transferred from the high tension source to the low tension source. The load being thus removed from the high tension source, the circuit of motor 8 across the high tension section may be opened by suitable switches without the necessity of interrupting a current of any material strength. The vehicle will now be receiving current from the local source only and the machines 8, 9 and 10 will continue to run, the machine 10 now being operated as a motor and receiving energy from the low tension section and driving the machine 9 as a booster to boost the electromotive force of the local source in the same way that it has previously boosted the electromotive force of machine 10 when the latter was operating as a generator.

With the connections above described the apparatus is placed in condition for operation in the low tension section, and any desired control of the speed is secured by varying and reversing the electromotive force of armature 9 by operation of rheostat 13 securing the mode of operation and results as previously described in connection with Fig. 3. Also the controlling switch 17 is made available for use when operating in the low tension section for the purpose of varying the motor connections from series to parallel relationship as shown in the different conditions of Fig. 3, and which motor connections correspond to those secured when operating in the high tension section as shown in Fig. 2. Movement of the controlling switch 17 to its final position also secures a condition of weakened field strength for the motors for high speeds as explained in connection with operation in the high tension section. During operation in the low tension section, however, the controlling switch 17 makes no change in connection of the armatures 9, 10 or any adjustments of their field strengths. For securing reverse movement of the vehicle when operating in the low tension section, I may use a form of controlling switch shown in Fig. 5 already described, or separate reversing means may be employed for reversing the field excitation of the motor fields or reverse the motor armature connections.

It will be understood that in passing from a low tension section into a high tension section, the controlling switch 17 should be in one of the positions from $e$ to $h$, and then after connecting the motor 8 to the high tension supply conductors, the change over switch may be moved from position $p$ to $k$ through the positions $m$ and $n$ and thus secure the connections for operation in the high tension section without any interruption of the supply of energy to the vehicle. In passing to the high tension section, the speed of motor 8 will be at approximately proper speed for connection to the high tension section, but if desired its speed may be adjusted by controlling the field strength of armature 10 as may be required to meet conditions. It will also be understood that when desired the change-over switch may be moved from the off-position either to position $k$ or to position $p$ directly without passing through the intermediate positions $m$ and $n$, such as when it is desired to start the vehicle from rest when in either section.

It will also be noted that when passing from one section to another without interrupting the supply of energy to the vehicle, and with the controlling switch 17 in one of the positions from $e$ to $h$, the speed of the vehicle may be lowered if desired by reducing and reversing the electromotive force of armature 9 by adjustment of the rheostat 13, thus insuring any speed desired when passing from one section to the other.

My invention is well adapted for electrically braking the vehicle or locomotive and restoring energy to the line. Thus, when operating in either section, the operator may move the speed controlling switch or switches gradually toward off-position and so cause the propelling motors to act as generators and supply current to the transforming apparatus and supply circuits. The degree of retardation and restoration of energy to the line will depend upon the adjustment of the controlling switches by the operator, and may also be controlled by adjusting the electromotive forces of the exciters 11 or 15, or by adjustment of the controlling rheostats. Ordinarily, the operator in electrically retarding the vehicle will gradually move the switch 17 toward off-position; thus, as the electromotive forces of the propelling motors gradually decrease as the vehicle comes to rest, the movement of switch 17 will cause the electromotive force, which is counter to that generated by the motors, to be decreased, thus maintaining an electric load on the motors and causing them to drive the armatures 9, 10. When in the high tension section, the machines 9, 10 will thus be driven as motors and in turn drive the machine 8 as a generator which will supply energy to the high tension conductors, the energy being thus transformed from the low tension energy delivered by the motors to the high tension energy of the line. When in the low tension section, the varying and reversing of the field of armature 9 by the rheostat 13 will control the braking action of the motors by causing the electromotive force opposing that of the motors to be gradually decreased as the vehicle comes to rest. The gradual movement of the controller 17 toward the off-position may also assist in bringing the vehicle to rest by electrical braking action of the motors when in the low tension section, and thus restoring energy to the supply conductors of the low tension section. When operating in both sections at the same time, energy will be restored to both supply sections simultaneously, and the ratio of restoration to the two sections may be varied as desired by adjusting the field strength of machine 10. Also by lowering the field strength of machine 10 by adjustment of rheostat 14, energy may be taken from the low tension supply conductors and transformed and delivered to the high tension section; and, similarly, by strengthening the field of machine 10 by rheostat 14, energy may be taken from the high tension section and transformed and delivered to the supply conductors of the low tension section.

It will of course be desired to interlock the various controlling devices in order to permit their operation by the operator only under certain conditions. For example, the change-over switch should be interlocked with the speed controlling switch 17 so that the former can be operated only when the latter is in the positions $e$ to $h$ inclusive, in case the change is made without interruption of the supply of energy; also the speed controlling switch 17 should be free to be operated to its full extent only when the change-over switch is in one or the other of its final running positions. Similarly, the reversing rheostat 13 should be limited in its movement while the controlling switch 17 is in certain positions when used in the high tension section, but should be freely movable when in the low tension section, or during the process of changing from one section to the other. Also if a separate reversing switch is used, the same should be so interlocked that it can be reversed only when the electromotive force of the motor armatures is practically zero or very low. Also various other parts may be interlocked if desired either mechanically or electrically. It will also be understood that suitable devices for starting the machines 8, 9 and 10 will be provided for the purpose of starting from rest when in either the high tension or low tension section. It will therefore be seen that by the employment of my invention, I can transfer the load from either source of supply to the other without necessarily changing materially the speed of the vehicle. Also the vehicle or train may be operated at any desired speed from either the high tension or low tension source, or at any speed while the load is divided between the two sources and the direction of movement reversed as desired. In operating the vehicle with the load divided between the two supply sources adjustment may be made so that the energy is taken from the sources in any desired ratio. I can also cause one source to supply the needed propelling energy and in addition deliver energy to the other source of supply. I can also restore energy to either or both sources by causing the vehicle to drive the propelling motors, causing them to act as generators and thereby deliver energy to one or both sources as desired, or to both in any desired ratio. I am also able to control the vehicle by means of a smooth voltage control from rest to full speed when receiving energy from either or both sources, by means of devices of comparatively simple construction. I also secure a variation of speed from rest to full speed and a wide variation of torque while avoiding detrimental losses in rheostats and the detrimental sudden changes in current strength and in torque. I may also employ a reasonably constant amount of power so as to secure maximum torque with corresponding speed with minimum waste of energy and can then pass by smooth and efficient control to a condition of maximum speed and corresponding torque while employing a reasonably constant power when this is desirable. By my invention I can also employ the most efficient form of motors and the form best adapted to operate without sparking and without overheating throughout the wide range of torque and speed desirable in railway practice; also such form of motors as is best adapted to act as generators for the purpose of regeneration and electrical braking. I also secure by my invention the wide variation of torque and speed without having to open circuits carrying large amounts of energy, or to close circuits so as to suddenly develop large amounts of energy. My invention renders it possible to readily control as desired amounts of power much larger than heretofore possible as the difficulties of control do not increase with the size of the apparatus and with the increase of the amount of energy employed, as is met with where large amounts of energy have to be suddenly interrupted or suddenly conducted by movable contacts. My invention also renders possible a very simple and reliable form of multiple unit control.

Although I have shown and described one form of controlling devices, it will be understood that their form and arrangement may be greatly modified to suit the requirements of particular conditions. For example, it may sometimes be desirable to provide a speed controller in the low tension section for the motor circuits, in addition to a speed controller for securing the desired motor control in the high tension section. It may also sometimes be desirable to make different combinations of the controlling parts than the precise form shown in the controllers of Fig. 4. Also, although I have indicated the use of a certain number of resistance steps for the purpose of field control, this number may be increased or otherwise modified as desired. Also, while I have shown and described a particular form of my invention in which there are two electromotive force producing windings in series with each other and with the motor armatures at the time when the vehicle or locomotive is passing from one section into the other, I may arrange the two windings in parallel or only one may be in use at that time, and if desired I may entirely disconnect the motors from one source of supply prior to connecting them to the other source.

Although I have indicated a method of control by the use of two units or voltage sources on the vehicle, and the use of four propelling motors, it will be understood that a larger number of such units may be used if desired as well as a different number of propelling motors. In some cases instead of using a single vehicle or locomotive unit, the apparatus may be carried upon more than one vehicle, and it will be understood that where I refer in the appended claims to "a vehicle," I mean to include the use of more than one vehicle forming a train. It will also be understood that any suitable method of multiple unit control may be applied to my invention for the purpose of controlling a plurality of locomotive units in a train.

In some cases the high tension source may produce uni-directional current instead of alternating current. Also in some cases instead of using a motor generator or motor generators for transforming the energy on the vehicle, I may use rectifiers or equivalent means for deriving a uni-directional current from the alternating current. Sometimes the low tension working conductors may be supplied with alternating current, and sometimes the sub-divided sources of energy on the vehicle may deliver alternating current. In some instances I may have a plurality of high tension sections in which certain characteristics of the energy are different and yet have the motor generator or motor generators adapted to be operated from each of said high tension sections. Similarly, I may have a plurality of low tension sections, the electrical characteristics of which may be different, and yet I may supply the motors from each of these sections as required. The source of energy for the low tension section may sometimes be a purely local source or may be in the form of a sub-station and deriving energy from a main source of energy. Sometimes a certain section will be fully equipped with both high tension and low tension working conductors, one of which will be used at certain times and the other at other times. For instance, one may be used during the day time and the other at night; or sometimes both sources may be high tension, or both may be low tension and yet I may secure many of the advantages of my invention. When a plurality of locomotive units are used, they may be adapted to operate separately or combined for use in the low tension section, the high tension terminals being connected so as to enable one low tension winding to receive energy, generate high tension energy and deliver such high tension energy to the other locomotive at high tension terminals and thus generate in the low tension circuits the desired low tension energy which can then be used in the same way as though the low tension winding were mechanically connected in one motor generator. Also when a plurality of locomotives are coupled, I may supply one from the high tension source and another from the low tension source while both act jointly on the common load.

When alternating current motors are used for propelling the vehicle, I prefer to use a plurality of static transformers for the purpose of transforming the high tension energy on the vehicle, and I also prefer to use motors having a series winding and adapted to operate on alternating current or direct current, although, of course, motors of either forms may be used where desired. In some cases I employ motors having a winding separately excited during retardation and in series with the motor armature current during acceleration or normal operation.

Figure 6:
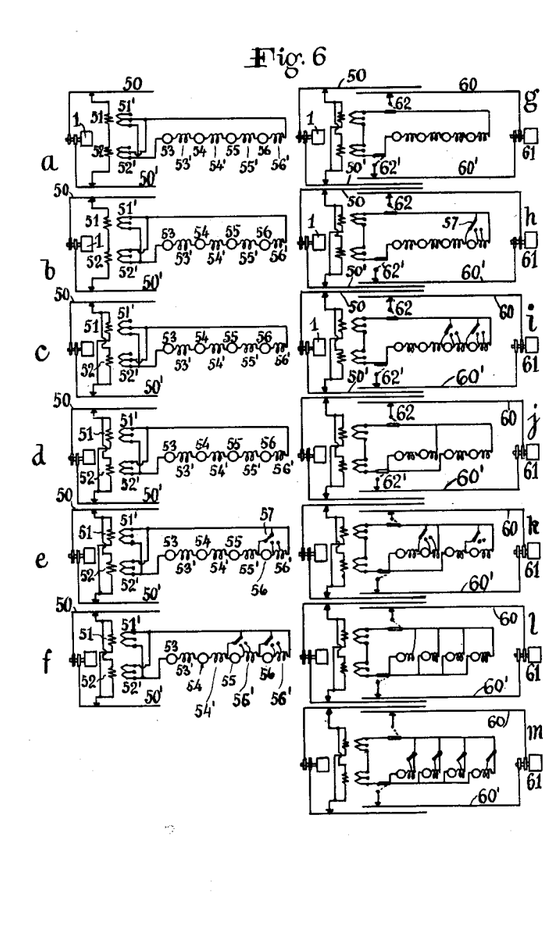
Fig. 6 is a diagram illustrating a modification.

Referring to Fig. 6, I have indicated diagrammatically various conditions of connections for the purpose of control when alternating currents are used in the motor circuits. The working conductors are indicated at 50, 50' extending from source 1; the primary and secondary windings of one static transformer are indicated at 51, 51' respectively, and the windings of the other transformer are indicated by the characters 52, 52'. From the secondary windings extend leads and taps for the purpose of obtaining increased variation in the electromotive force applied to the motor circuits. The four motor armatures are indicated by the characters 53, 54, 55 and 56, and their respective field windings by the characters 53', 54', 55', 56'. At condition $a$ of Fig. 6, the condition of maximum torque and low speed is obtained. The primary windings 51, 52 being connected in series with each other across the supply conductors, and portions of the secondary windings 51', 52' being connected in parallel with each other and thus supplying current of low electromotive force to the motor circuit which contains the motors connected in series with each other. In condition $b$, an increased electromotive force is applied to the motor circuit by connecting an increased number of turns of each secondary winding in parallel with each other. We may then pass to condition $c$ in which the primary windings of the transformers are connected in parallel with each other, thereby causing each of said windings to receive the full electromotive force of the supply conductors. In this condition however, the connections of the secondaries have been changed from condition $b$ to a condition in which only portions of the two secondary windings are connected in parallel with each other. In condition $d$, an increased electromotive force is applied to the motor circuit by connecting an increased portion of each secondary winding in parallel with each other. In condition $e$, one of the motors has been short circuited or removed from circuit by means of a switch 57, which first cuts out part of the field winding 56' and then all of this field winding thereby reducing the counter-electromotive force of the armature 56, after which this armature is short circuited as shown at condition $e$, which causes the full electromotive force of the motor circuit to be applied to the remaining three motors in series. In condition $f$, the motor 55 has similarly been removed from circuit, causing the full electromotive force of the motor circuit to be applied to the remaining two motors in series. In condition $g$, all of the motors have been placed in series with each other as before, but the increased speed is maintained by connecting the secondary windings 51', 52' in series with each other, which approximately doubles the electromotive force applied to the motor circuit as compared with the condition of connections shown at $d$. In condition $h$, an increased speed is obtained by removing the motor 56 from circuit, as referred to in connection with condition $e$. In condition $i$, the motor 55 has similarly been removed from circuit, and in condition $j$, two motor circuits are shown in parallel, each containing two propelling motors in series. A further increase in speed is gradually obtained in passing to condition $k$, by simultaneously and gradually reducing the counter-electromotive force of the armatures 54, and 56, and then removing the same from circuit. In condition $l$, all four motors are connected in parallel with each other, and in condition $m$, the maximum speed is obtained by simultaneously weakening the field strength of all of the motors. It will thus be seen that I have passed from a condition of low speed and maximum torque to a high speed with minimum torque, securing a wide range of control, and it will also be understood that by reason of the relationship of the parts described, I have secured great economy in the required capacity of the transforming apparatus, as well as economy in operation.

Although Fig. 6 indicates one form of control, it will be understood that variations may be made from the exact form indicated, without departing from the scope of my invention. It will also be understood that a controlling switch or switches for securing the connections indicated in Fig. 6 may be designed or arranged in various ways, as will be understood by those skilled in the art.

Having described the connections of Fig. 6 with reference to their arrangement and mode of operation and operating in a high tension section, I have indicated in conditions $g$ to $m$ of Fig. 6 low tension working conductors 60, 60' extending from an alternating current source 61, although a direct current source may be used if desired. If the locomotive is operating in any of the positions $g$ to $m$ when passing from the high tension section into the low tension section, the switches 62, 62' may be thrown to connect the motor circuit with the low tension working conductors 60, 61' breaking the connection of this circuit with the secondary windings 51', 52', it being assumed that the electromotive force of the low tension section is approximately the same as the electromotive force derived from the secondary windings 51', 52' when connected as shown in positions $g$ to $m$, or that adjustment is made so that the electromotive forces are approximately equal, the speed control in the low tension section may then be obtained by variation of motor connections as shown in conditions $g$ to $m$ of Fig. 6. It will be desirable to provide adjustable means for reducing the electromotive force applied to the motor circuit when in the low tension section, such as by means of the adjustable reaction coil or adjustable counter-electromotive force producing device.

Various protective and indicating devices may be used in conjunction with the controlling devices and apparatus when employing my invention, as will be understood by those skilled in the art.

In putting into circuit a dead series motor which is to be connected in parallel with a working motor, it is desirable to use a resistance to prevent an improper rush of current, and then gradually remove such resistance. With an alternating current, a choke coil or equivalent device might be used. In the case of either a direct or alternating current, a resistance or counter-electromotive force device might be temporarily excited by connecting it across a low tension electromotive force exciter either direct or alternating current as required, or the series field magnet might be placed in series with the working motor current, or with some part thereof before connecting the motor in parallel.

Having thus described my invention, I declare that what I claim as new and desire to secure by Letters Patent, is—

1. The method of operating a railway vehicle which consists in conducting upon the vehicle low tension energy at one time, conducting upon the vehicle high tension energy at another time, applying energy on the vehicle in either case to a local circuit on the vehicle containing the armatures of the propelling motors, varying an electromotive force in series in said local circuit for controlling the energy in said circuit, and varying the circuit connections of said armatures relative to each other.

2. The method of operating a railway vehicle which consists in leading low tension energy upon the vehicle at one time, passing at least a portion of said energy through a source of electromotive force and the armature of a propelling motor, and at another time leading high tension energy upon the vehicle, transforming said high tension energy into low tension energy, passing at least a portion of said latter energy through said source and a motor armature.

3. The method of operating a motor which consists in simultaneously supplying to the motor energy from a high tension source and from a low tension source, and varying and reversing an electromotive force developed in series with the motor and with said low tension source for controlling the energy jointly supplied thereto.

4. The method of operating an electric motor which consists in generating two electromotive forces in a local loop on the vehicle containing the motor armature, generating an exterior electromotive force, and supplying to the motor armature energy due to the joint action of said two electromotive forces and the exterior electromotive force.

5. The method of operating a railway vehicle which consists in supplying low tension energy to the vehicle from a stationary source, supplying high tension energy to the vehicle from a stationary source, transforming said high tension energy to low tension energy, supplying energy from said source to the propelling motor armatures, controlling said armatures in either case by varying an auxiliary electromotive force in series with the motor armatures, and varying the circuit connections of said armatures relative to each other.

6. The method of controlling a plurality of electric motors acting on a common load which consists in supplying energy to the motor armatures, controlling said energy by two electromotive force producing windings by connecting said windings in series and in parallel with each other, connecting the motor armatures in series and in parallel with each other, and varying the relative electromotive forces of said windings and the relative electromotive forces upon the motor armatures.

7. The method of gradually increasing the speed of a plurality of motors acting on a common load which consists in generating electric energy at two sources and supplying energy therefrom at different voltages while connected in parallel with each other to the motor armatures connected in series with each other, then supplying energy therefrom while connected in parallel to the motor armatures in parallel with each other, and then supplying energy from the two sources while connected in series with each other to the motor armatures in parallel with each other.

8. The method of operating a plurality of motors connected to a common load which consists in controlling the electromotive force supplied to the motor armatures by two electromotive force producing windings, gradually varying the relative electromotive forces upon the motor armatures and connecting the motor armatures in series and in parallel, gradually varying the relative electromotive forces of said windings, and connecting said windings in series and in parallel.

9. The method of operating a plurality of electric motors connected to a common load which consists in generating energy at two sources, suppling energy at different voltages from said sources while connected in parallel with each other to two motor windings connected in series with each other, then supplying current to the motor windings while connected in parallel with each other, and then supplying current from said sources while connected in series with each other to the motor windings while said motor windings are connected in parallel with each other.

10. The method of controlling a plurality of electric motors acting on a common load which consists in supplying energy to the motor armatures derived from two different sources having different electric characteristics, connecting the motor armatures in series and in parallel, and causing the motor armatures to generate braking energy.

11. The combination of a source of high tension electric energy, an electric vehicle, means comprising an electromotive force producing winding on said vehicle for deriving low tension energy from said source, a plurality of electric motors for propelling a vehicle supplied with current from said winding, a separate stationary source of electric energy adapted to supply current to the motors, and means for connecting the motor armatures in series and in parallel when supplied with current either from said winding or from said separate source.

12. In a railway system, a high tension source, a low tension source, a vehicle, a plurality of propelling electric motors, means on the vehicle for converting high tension energy from the high tension source into low tension energy, means for supplying low tension energy to the propelling motors, and means for varying the electromotive force of the energy supplied to the motor armature circuits when supplied with energy derived from the high tension source or with energy derived from the low tension source, and for connecting the motor armatures in series and in parallel with each other when supplied with energy from either source.

13. The combination of a plurality of electric motors each of which has a field winding energized independently of its armature current, two electromotive force producing windings, the armatures of said motors being connected in series with each other and in series with said windings, and means for varying the joint electromotive force of said windings from the sum of their electromotive forces to the difference of their electromotive forces and for connecting the motor armatures in parallel.

14. The combination of a plurality of electric motors each of which has a field winding energized independently of its armature current, two electromotive force producing windings for supplying energy to the motor windings, a source of high electromotive force for supplying energy to said electromotive force producing windings, and means for connecting said motor windings in series and in parallel and for connecting said electromotive force producing windings in series and in parallel.

15. The combination of a stationary source of energy, a vehicle supplied with energy therefrom, a plurality of electric motors, means for connecting the armatures of said motors in series and in parallel with each other, means comprising a winding for supplying a variable and reversible electromotive force to said motor windings when connected in series or in parallel, and a second stationary source of energy having different characteristics and adapted to supply energy for propelling the vehicle.

16. The combination of a source of high tension energy, a vehicle having an electric propelling motor, a moving contact for conducting the high tension energy to the vehicle, means on the vehicle for deriving low tension energy from the high tension energy, a local source of low tension energy, a moving contact for conducting low tension energy from said local source to the vehicle, means comprising a winding on the vehicle for boosting the electromotive force of the local source and supplying the boosted electromotive force to the armature of said motor.

17. The combination of a low tension source of electromotive force, a vehicle having electric propelling motors, a booster on the vehicle, means for supplying energy at the boosted electromotive force to the propelling motors, and means for operating the vehicle from a high tension source of electromotive force.

18. The combination of a vehicle having an electric propelling motor, a high tension source of energy, a low tension source of energy, means comprising two electromotive force producing windings for operating the vehicle with energy from each of said sources, and means for connecting one of said windings in series with the armature of a propelling motor and the other of said windings in parallel with said armature.

19. The combination of an electric vehicle, a propelling electric motor, two electromotive force producing windings on the vehicle, means for causing said windings to generate energy and supply the energy generated to said motor, and means for causing one of said windings to generate energy and supply energy to said motor while the other winding is caused to absorb electric energy.

20. The combination of an electric motor, two electromotive force producing windings, means for connecting said windings in series and in parallel to supply energy to said motor, and means for connecting one of said windings in series with a winding of the motor and the other of said windings in parallel with the circuit containing the first named winding and the winding of said motor.

21. The combination of a vehicle, an electric propelling motor, two electromotive force producing windings, and means for connecting one of said windings in series with the armature of the propelling motor and the other of said windings in the branch circuit in parallel with the branch containing the first named winding and motor armature, and for connecting said windings in series with reference to each other and for connecting said windings in parallel with each other with reference to the motor armature.

22. The method of operating a railway vehicle which consists in leading high tension energy on the vehicle, transforming said energy into low tension energy and supplying the transformed energy to a propelling motor, leading on the vehicle low tension energy, transforming part of said low tension energy on the vehicle and combining the transformed energy with the energy not transformed, and supplying the same to the propelling motor.

23. The method of operating a plurality of motors connected to a common load which consists in controlling the electromotive force supplied to the motor armatures by two electromotive force producing windings, gradually varying the relative electromotive forces upon the motor armatures and connecting the motor armatures in a plurality of different ways relative to each other, gradually varying the relative electromotive forces of said windings, and connecting said windings in a plurality of different ways relative to each other.

24. The method of operating a plurality of electric motors acting on a common load which consists in supplying energy from two different sources having different electrical characteristics, controlling the energy supplied to the motor armatures by two electromotive force producing windings, varying the electromotive force of said windings, and varying the circuit connections of said motor armatures relative to each other.

25. The combination of a plurality of electric motors each of which has a field winding energized independently of its armature current, two electromotive force producing windings for supplying energy to the motor windings, a source of high electromotive force for supplying energy to said electromotive force producing windings, and means for connecting said motor windings in a plurality of different ways and for connecting said electromotive force producing windings in a plurality of different ways.

26. The method of controlling a plurality of motors acting on a common load which consists in supplying energy to the motor armatures, controlling said energy by varying the relative electromotive forces of two electromotive force producing devices functionally related to the motor armatures, and varying the relative electromotive forces applied to the motor armatures.

In testimony whereof I affix my signature, in presence of two witnesses.

HARRY WARD LEONARD.

Witnesses:
LEONARD KEBLER,
B. E. SMYTHE.